US012189782B2

(12) United States Patent
Difonzo et al.

(10) Patent No.: US 12,189,782 B2
(45) Date of Patent: Jan. 7, 2025

(54) METHODS AND SYSTEMS FOR NATURAL LANGUAGE PROCESSING OF GRAPH DATABASE QUERIES

(71) Applicant: The MITRE Corporation, McLean, VA (US)

(72) Inventors: Christine M. Difonzo, Rockville, MD (US); Steven E. Noel, Woodbridge, VA (US)

(73) Assignee: The MITRE Corporation, McLean, VA (US)

( * ) Notice: Subject to any disclaimer, the term of this patent is extended or adjusted under 35 U.S.C. 154(b) by 448 days.

(21) Appl. No.: 17/543,184

(22) Filed: Dec. 6, 2021

(65) Prior Publication Data
US 2022/0414228 A1 Dec. 29, 2022

Related U.S. Application Data

(60) Provisional application No. 63/214,164, filed on Jun. 23, 2021.

(51) Int. Cl.
*G06F 21/57* (2013.01)
*G06F 16/2452* (2019.01)
*G06F 16/901* (2019.01)
*G06F 16/9032* (2019.01)
*G06F 40/169* (2020.01)
(Continued)

(52) U.S. Cl.
CPC ...... *G06F 21/577* (2013.01); *G06F 16/24522* (2019.01); *G06F 16/9024* (2019.01);
(Continued)

(58) Field of Classification Search
CPC ............. G06F 21/577; G06F 16/24522; G06F 16/9024; G06F 16/90332; G06F 40/169;
(Continued)

(56) References Cited

U.S. PATENT DOCUMENTS 10,872,116 B1 * 12/2020 Yim .................... G06F 16/61
11,604,925 B1 * 3/2023 Lee .................... G06N 3/0442
(Continued)

FOREIGN PATENT DOCUMENTS

CN 109033135 A 12/2018
CN 110990536 A 4/2020
(Continued)

OTHER PUBLICATIONS

Mondal et al. "Natural Language Query to NoSQL Generation Using Query-Response Model," International Conference on Machine Learning and Data Engineering, 2019, Taiwan; pp. 85-90.
(Continued)

*Primary Examiner* — Cheng-Feng Huang
(74) *Attorney, Agent, or Firm* — Morrison & Foerster LLP

(57) ABSTRACT

Methods and systems for translating a natural language user query into a graph database query are described. In some instances, the methods may comprise receiving a first input from a user comprising a natural language query regarding data in a graph database; processing the natural language query using a named entity recognition (NER) machine learning model to extract named entities from the natural language query and tag them according to an entity type; processing the tagged named entities using a semantic similarity algorithm to identify corresponding nodes and edges, and their associated properties, in the graph database; processing the natural language query using an intent classification machine learning model to determine a user intent for the natural language query; and applying a user intent-based template to the identified nodes and edges to formulate a graph database query that corresponds to the natural language query.

20 Claims, 14 Drawing Sheets

(51) Int. Cl.
*G06F 40/295* (2020.01)
*G06F 21/55* (2013.01)

(52) U.S. Cl.
CPC ...... *G06F 16/90332* (2019.01); *G06F 40/169* (2020.01); *G06F 40/295* (2020.01); *G06F 21/552* (2013.01); *G06F 2221/034* (2013.01)

(58) Field of Classification Search
CPC . G06F 40/295; G06F 21/552; G06F 2221/034
See application file for complete search history.

(56) References Cited

U.S. PATENT DOCUMENTS

| | | |
|---|---|---|
| 2018/0121500 A1 | 5/2018 | Reschke et al. |
| 2019/0188218 A1 | 6/2019 | Harris et al. |
| 2020/0104362 A1* | 4/2020 | Yang ...................... G06N 5/048 |
| 2020/0401590 A1 | 12/2020 | Staar et al. |
| 2021/0326531 A1* | 10/2021 | Kumar .................. G06F 40/279 |

FOREIGN PATENT DOCUMENTS

| | | |
|---|---|---|
| CN | 111008309 A | 4/2020 |
| CN | 111339246 A | 6/2020 |
| CN | 111241252 B | 8/2020 |
| KR | 102150908 B1 | 8/2020 |

OTHER PUBLICATIONS

Montgomery et al. "Towards a Natural Language Query Processing System," 1st International Conference on Big Data Analytics and Practices, 2020, Thailand; pp. 1-6.

* cited by examiner

Match ( :Services)-[s]->(inside:Inside_IP)-[r]-
( : Outside_IP), (inside:Inside_IP)-[t*2]->
( : Plugin_Critical) return r, s, t limit 10

FIG. 2

"Show me machines that talk to outside IPs, have critical vulnerabilities, and host network services."

Match ( :Services)-[s]->(inside:Inside_IP)-[r]-
( : Outside_IP), (inside:Inside_IP)-[T*2]->
( : Plugin_Critical) return r, s, t limit 10

METHODS AND SYSTEMS FOR NATURAL LANGUAGE PROCESSING OF GRAPH DATABASE QUERIES

CROSS-REFERENCE TO RELATED APPLICATIONS

This application claims the priority benefit of U.S. Provisional Patent Application Ser. No. 63/214,164, filed Jun. 23, 2021, the contents of which are incorporated herein by reference in their entirety.

FIELD OF THE DISCLOSURE

The present disclosure relates generally to the use of graph databases for cybersecurity analysis, and more specifically to methods and systems for translating natural language-based user queries into graph database queries to facilitate ease-of-use and efficient access to graph database analytical tools.

BACKGROUND

Computer networks are often complex, and may comprise numerous individual computing devices that communicate with one another and share data. Furthermore, computer networks may be continuously changed or updated, with computing machines added and/or removed, software patches applied, new applications installed, firewall rules changed, etc. These changes can have substantial impacts on the security and vulnerability of the computer network and the organization that employs it.

Often, simply detecting a network intrusion may not be sufficient to effectively understand and visualize how the purported attack might impact the computer network's mission critical functions. Often, the obstacle to analyzing a computer network for vulnerabilities is not the lack of network information, but rather the inability to assemble disparate pieces of network information into an overall analytical representation of situational awareness and optimal courses of action for maintaining mission readiness.

Graph-based cybersecurity analysis systems provide powerful tools for visualizing the status of complex computer networks and rapidly assessing the potential impact of network vulnerabilities and adversarial attacks. However, such systems may require that users learn complex graph database query languages to pose questions and take full advantage of their analytical capabilities.

Accordingly, there has been a need to develop novel methods and systems for automated processing and translation of natural language-based user queries into graph database queries that facilitate ease-of-use and enable efficient access to powerful graph database analytical tools.

SUMMARY

Disclosed herein are methods and systems for automated processing and translation of natural language-based user queries into graph database queries that facilitate ease-of-use and enable efficient access to the powerful analytical capabilities of graph database systems, e.g., graph-based cybersecurity analysis systems.

Disclosed herein are computer-implemented methods for translating a natural language user query into a graph database query comprising: receiving a first input from a user comprising a natural language query regarding data in a graph database; processing the natural language query using a named entity recognition (NER) machine learning model to extract named entities from the natural language query and tag them according to an entity type; processing the tagged named entities using a word similarity algorithm to identify corresponding nodes and edges, and their associated properties, in the graph database; processing the natural language query using an intent classification machine learning model to determine a user intent for the natural language query; and applying a user intent-based template to the identified nodes and edges to formulate a graph database query that corresponds to the natural language query.

In some embodiments, the computer-implemented method further comprises dynamically analyzing paths in a graph data model stored in the graph database to automatically determine a number of edge connections between a pair of the identified nodes. In some embodiments, the computer-implemented method further comprises displaying the graph database query on a display device and receiving a second input comprising feedback from the user. In some embodiments, the second input comprising feedback from the user is a confirmation that the graph database query is an accurate translation of the natural language query. In some embodiments, the second input comprising feedback from the user is a correction to the graph database query. In some embodiments, the computer-implemented method further comprises submitting the graph database query to the graph database. In some embodiments, the computer-implemented method further comprises returning a graph database result following submission of the graph database query to the graph database. In some embodiments, the graph database result comprises a visual display of nodes and edges in a subgraph of the graph database that match the graph database query. In some embodiments, the graph database result comprises numbers or text. In some embodiments, the named entity recognition (NER) machine learning model comprises a supervised learning model. In some embodiments, the named entity recognition (NER) machine learning model comprises a recurrent neural network (RNN). In some embodiments, the named entity recognition (NER) machine learning model is trained using a set of annotated natural language queries. In some embodiments, the training of the named entity recognition (NER) machine learning model is updated according to the feedback received from the user. In some embodiments, the intent classification machine learning model comprises a supervised learning model. In some embodiments, the intent classification machine learning model comprises a Bidirectional Encoder Representations from Transformers (BERT) model, a long short-term memory (LSTM) model, or a Naïve Bayes model. In some embodiments, the intent classification machine learning model is trained using a set of intent-labeled natural language queries. In some embodiments, the training of the intent classification machine learning model is updated according to the feedback received from the user. In some embodiments, no prior knowledge of the underlying graph database schema is required of the user.

Also disclosed herein are computer-implemented methods comprising: displaying, within a first region of a graphical user interface, a prompt requesting input from a user; displaying, within a second region of the graphical user interface, a first input from the user comprising a natural language query; and displaying, within a third region of the graphical user interface, a graph database query corresponding to the natural language query.

In some embodiments, the computer-implemented method further comprises displaying, within a fourth region of the graphical user interface, one or more drop-down menus or buttons that allow the user to provide additional input. In some embodiments, one of the one or more drop-down menus or buttons allows the user to confirm that the graph database query is an accurate translation of the natural language query. In some embodiments, one of the one or more drop-down menus or buttons allows the user to edit the graph database query. In some embodiments, one of the one or more drop-down menus or buttons allows the user to reject the graph database query. In some embodiments, the computer-implemented method further comprises displaying, within a fifth region of the graphical user interface, a visualization of nodes and edges returned from a graph database upon submission of the graph database query. In some embodiments, the first region and second region of the graphical user interface are the same or substantially overlap. In some embodiments, the second region and third region of the graphical user interface are the same or substantially overlap. In some embodiments, the third region and fourth region of the graphical user interface are the same or substantially overlap. In some embodiments, the fourth region and the fifth region of the graphical user interface are the same or substantially overlap.

Disclosed herein are systems comprising for translating a natural language user query into a graph database query comprising: one or more processors; and a memory communicatively coupled to the one or more processors and configured to store instructions that, when executed by the one or more processors, cause the computer system to: receive a first input from a user comprising a natural language query regarding data in a graph database; process the natural language query using a named entity recognition (NER) machine learning model to extract named entities from the natural language query and tag them according to an entity type; process the tagged named entities using a word similarity algorithm to identify corresponding nodes and edges, and their associated properties, in the graph database; process the natural language query using an intent classification machine learning model to determine a user intent for the natural language query; and apply a user intent-based template to the identified nodes and edges to formulate a graph database query that corresponds to the natural language query.

Also disclosed herein are non-transitory, computer-readable storage media storing one or more programs, the one or more programs comprising instructions, which when executed by one or more processors of a computer system, cause the computer system to: receive a first input from a user comprising a natural language query regarding data in a graph database; process the natural language query using a named entity recognition (NER) machine learning model to extract named entities from the natural language query and tag them according to an entity type; process the tagged named entities using a word similarity algorithm to identify corresponding nodes and edges, and their associated properties, in the graph database; process the natural language query using an intent classification machine learning model to determine a user intent for the natural language query; and apply a user intent-based template to the identified nodes and edges to formulate a graph database query that corresponds to the natural language query.

INCORPORATION BY REFERENCE

All publications, patents, and patent applications mentioned in this specification are herein incorporated by reference in their entirety to the same extent as if each individual publication, patent, or patent application was specifically and individually indicated to be incorporated by reference in its entirety. In the event of a conflict between a term herein and a term in an incorporated reference, the term herein controls.

BRIEF DESCRIPTION OF THE DRAWINGS

Various aspects of the disclosed methods and systems are set forth with particularity in the appended claims. A better understanding of the features and advantages of the disclosed methods, devices, and systems will be obtained by reference to the following detailed description of illustrative embodiments and the accompanying drawings, of which:

FIG. 2 provides a non-limiting example of a user query as posed in a native graph database query language.

DETAILED DESCRIPTION

Figure 1:
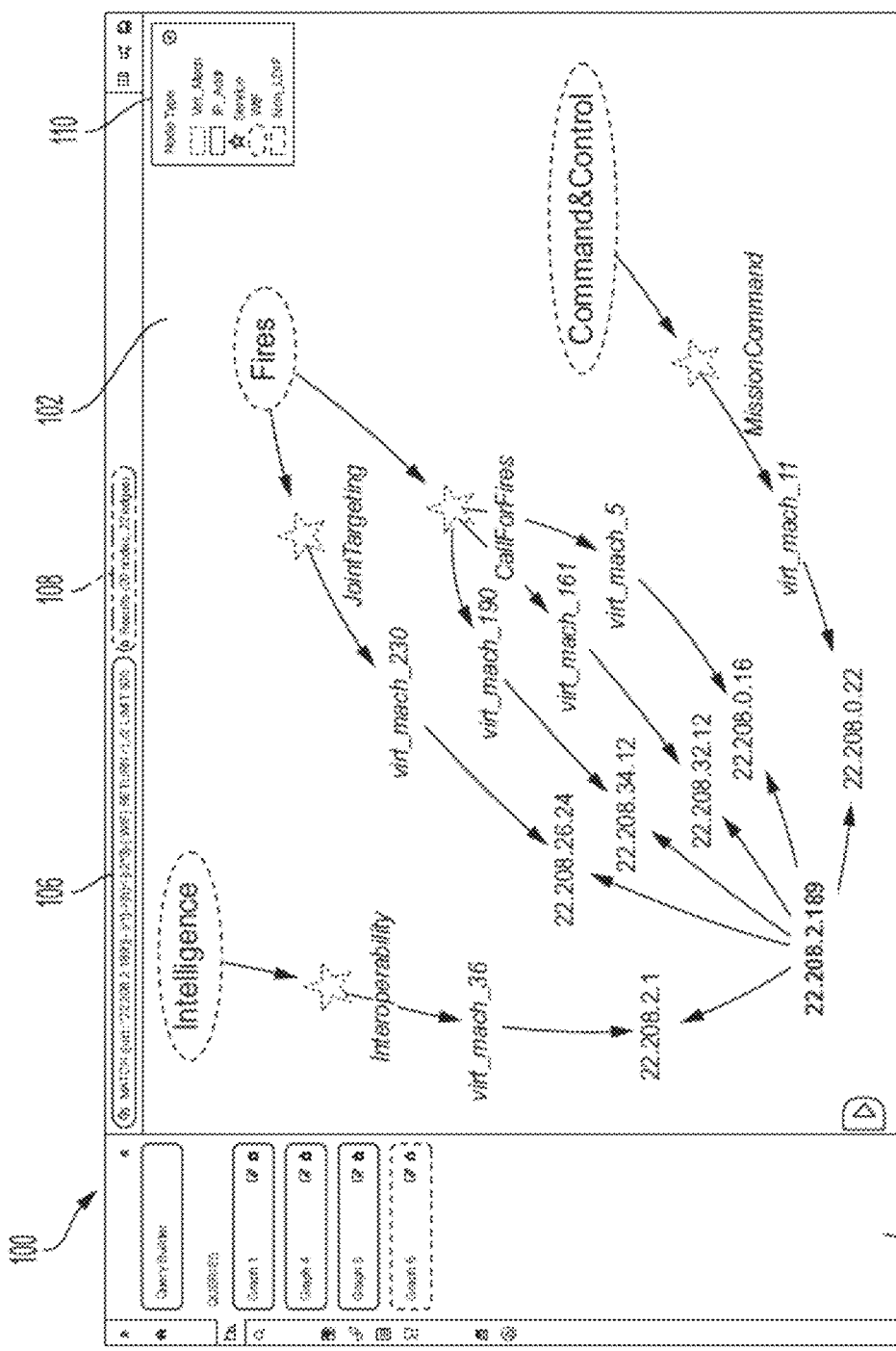
FIG. 1 provides a non-limiting example of a graph database query result as visualized in an interactive graphical user interface (GUI).

Disclosed herein are methods and systems for automated processing and translation of natural language-based user queries into graph database queries that facilitate ease-of-use and efficient user access to the powerful analytical capabilities of graph database systems, e.g., graph-based cybersecurity analysis systems.

Graph databases differ from traditional databases in that data is organized with a focus on the relationships between data points, which are represented by nodes, edges, and their associated properties. Nodes represent entities or instances to be tracked (e.g., people, organizations, accounts, computers and other computer network hardware assets, program objectives, etc.). Edges represent the connections or relationships between nodes, and may be directed (e.g., have different meanings depending on their direction) or undirected (e.g., have a single meaning). Properties comprise information that is associated with nodes and/or edges. Informative patterns may emerge when examining the interconnections of nodes, edges, and properties as visualized in a graph, i.e., the subset of nodes and edges in the database that satisfy the criteria set forth in a user query and that are returned upon submission of the user query to the graph database.

The process of formulating user queries for graph database systems is often complex. Users may be required to learn complex graph database query languages as well as to have knowledge of the underlying graph data model. The disclosed methods utilize contextual natural language processing (NLP) and machine learning to go beyond predefined user question structures to identify user intent, and to generate formal graph database queries based on the identified intent. The disclosed methods and systems eliminate the need for users to write formal graph queries, significantly reduce the amount of time required to submit queries and answer operational questions, and enable more efficient user access to powerful graph database analytical tools. Although described primarily in the context of cybersecurity analysis systems, the disclosed methods are not limited to cybersecurity analysis systems and may be applicable to any analytical system comprising a graph database.

Computer-implemented methods for translating a natural language user query into a graph database query are described that, in some instances, comprise: receiving a first input from a user comprising a natural language query regarding data in a graph database; processing the natural language query using a named entity recognition (NER) machine learning model to extract named entities from the natural language query and tag them according to an entity type; processing the tagged named entities using a semantic similarity algorithm to identify corresponding nodes and edges, and their associated properties, in the graph database; processing the natural language query using an intent classification machine learning model to determine a user intent for the natural language query; and applying a user intent-based template to the identified nodes and edges to formulate a graph database query that corresponds to the natural language query.

Also described are associated graphical user interfaces (GUIs) that, in some instances, comprise: displaying, within a first region of a graphical user interface, a prompt requesting input from a user; displaying, within a second region of the graphical user interface, a first input from the user comprising a natural language query; and displaying, within a third region of the graphical user interface, a graph database query corresponding to the natural language query.

Systems for translating a natural language user query into a graph database query are described that, in some instances, comprise one or more processors; and a memory communicatively coupled to the one or more processors and configured to store instructions that, when executed by the one or more processors, cause the computer system to: receive a first input from a user comprising a natural language query regarding data in a graph database; process the natural language query using a named entity recognition (NER) machine learning model to extract named entities from the natural language query and tag them according to an entity type; process the tagged named entities using a semantic similarity algorithm to identify corresponding nodes and edges, and their associated properties, in the graph database; process the natural language query using an intent classification machine learning model to determine a user intent for the natural language query; and apply a user intent-based template to the identified nodes and edges to formulate a graph database query that corresponds to the natural language query.

Also described are non-transitory computer readable storage media storing one or more programs, the one or more programs comprising instructions which, when executed by one or more processors of a system, cause the system to receive a first input from a user comprising a natural language query regarding data in a graph database; process the natural language query using a named entity recognition (NER) machine learning model to extract named entities from the natural language query and tag them according to an entity type; process the tagged named entities using a semantic similarity algorithm to identify corresponding nodes and edges, and their associated properties, in the graph database; process the natural language query using an intent classification machine learning model to determine a user intent for the natural language query; and apply a user intent-based template to the identified nodes and edges to formulate a graph database query that corresponds to the natural language query.

Definitions

Unless otherwise defined, all of the technical terms used herein have the same meaning as commonly understood by one of ordinary skill in the art in the field to which this disclosure belongs.

As used in this specification and the appended claims, the singular forms "a", "an", and "the" include plural references unless the context clearly dictates otherwise. Any reference to "or" herein is intended to encompass "and/or" unless otherwise stated.

As used herein, the terms "comprising" (and any form or variant of comprising, such as "comprise" and "comprises"), "having" (and any form or variant of having, such as "have" and "has"), "including" (and any form or variant of including, such as "includes" and "include"), or "containing" (and any form or variant of containing, such as "contains" and "contain"), are inclusive or open-ended and do not exclude additional, un-recited additives, components, integers, elements or method steps.

The section headings used herein are for organizational purposes only, and are not to be construed as limiting the subject matter described.

Natural Language Processing & Query Generation for Graph Databases:

Graph database systems provide analytical capabilities for deriving sophisticated insights and maintaining real-time situational understanding of complex networks through data analytic and visualization platforms (e.g., the CyGraph cybersecurity platform (The MITRE Corporation, McLean, VA)). In such systems, ad hoc queries support the ability of users to pose flexible, open-ended analytic questions rather than being constrained to viewing a set of pre-defined analytical results.

However, at present, the process of formulating ad hoc queries to answer specific operational questions is time consuming and requires specialized knowledge. Query formulation can be particularly challenging for graph-based systems that provide deep, multi-level correlations for complex webs of interrelated data elements. In cyberspace, for example, networks and threats are continually evolving, and time-sensitive incidents can be missed when security analysts' focus is diverted to query generation rather than to threat detection, mitigation, and response. Existing solutions for translating English to graph database queries are based on pre-defined question structures that involve manually tagging English queries with specific node names and their respective data types. Pre-defining these rules for the graph model is extremely laborious and the rules only apply to the specific dataset schema they are being defined for. Therefore, there is no flexibility when applying the rules to a different dataset. There is support for natural language processing in some log analysis tools (e.g., Splunk). However, the relatively flat, tagged-data model used by such tools does not easily support the deep (multilevel) correlation provided by graph database approaches and required for monitoring and effective situational understanding of complex systems, e.g., cyber networks.

The disclosed methods and systems for machine learning-based natural language processing and graph database query generation alleviate the cognitive load placed on system users (e.g., security analysts) and facilitate ease-of-use for graph database systems. The methods utilize contextual natural language processing and machine learning to go beyond rigid, pre-defined query structures and support flexible ad hoc queries posed in a natural language. The methods infer user intent in the natural language query and generate corresponding queries in the formal graph database query language. This significantly reduces the level of specialized technical knowledge required by system users to extract actionable information from the graph database platform. Moreover, natural language is used extensively in operational environments (e.g., in chat, email, etc.). The disclosed methods and systems allows interaction with a graph database analytic system to be part of that operational ecosystem.

For example, the disclosed machine learning-based natural language processing and graph database query generation methods compile graph database node and edge properties, semantically identify the formal property that is most similar to that referenced by the user in their English question, and then return a graph database query with formal node and edge properties. This allows the approach to be domain agnostic and be applied to any dataset.

Additionally, the disclosed methods are designed to learn and improve through interaction with operators and other aspects of the operational environment. The methods employ adaptive processes that leverage operator decisions as feedback for continual improvement in the associated machine learning functions. User interface capabilities like auto-complete and auto-correction also speed up this recommendation and feedback process. Operator adjustments such as corrections to machine-translated queries prompt the machine learning model to learn and adapt.

Graph database models comprising nodes, edges, and node/edge properties are inherently domain agnostic. Thus graph database systems enhanced with the disclosed methods and systems for natural language processing and automated generation of graph database queries have potential applicability to a variety of markets (e.g., intelligence, critical infrastructure, social media, etc.) that would benefit from capturing complex interdependencies among disparate data elements to produce a unified graph model.

FIG. 1 provides a non-limiting example of a graph database query result as visualized in an interactive graphical user interface (GUI) 100 for a military cybersecurity analysis platform (e.g., the CyGraph cybersecurity platform). The graph shown in the main panel 102 of the GUI comprises the set of nodes (represented in the figure by node names or unique identifiers for a variety of different node types, e.g., virtual machines, IP addresses, services, warfighting functions (WfF), and non-lightweight directory interchange format (non-LDIF) entities) and edges (represented by arrows) that match the criteria posed in a graph database query. As illustrated in FIG. 1, the GUI may also comprise a series of buttons or tabs (e.g., in left panel 104) that provide access to a query builder function and/or to access the graph results for a plurality of previous queries. In some instances, the graph database system may provide pre-defined graph database query templates that allow a user to build query components from form selections. They may also support ad hoc queries in a native graph database query language for the graph database (e.g., the Neo4J graph database (Neo4J, Inc., San Mateo, CA)). As illustrated in FIG. 1, the GUI may also comprise a display of the specific query (e.g., in a particular GUI field or panel 106) for which results are presented in the main panel 102, a summary of the results returned for the specific query (e.g., in a particular GUI field or panel 108), a legend providing a summary of node types displayed (e.g., in another GUI field or panel 110), or any combination of the functionality and displayed information described herein. In some instances, the returned information may comprise text or a number instead of a generated graph query (e.g., in response to the query "how many warfighting units are currently performing a specified task?").

As illustrated in FIG. 2, queries in a native graph database query language can be complex. In this non-limiting example, "Match" is an instruction to identify dataset entities (nodes) and edges (relationships) that match the query criteria included in the remainder of the command. The "(Services)" portion of the query is an instruction to identify a list of network services in the graph database. The "(inside: Inside_IP)" portion of the query is an instruction to identify IP addresses that reside inside of a protection perimeter. The "(:Outside_IP)" portion of the query is an instruction to identify IP addresses that reside outside of a protection perimeter. Thus, the "(:Services)-[s]→(inside:Inside_IP)-[r]-(:Outside_IP)" portion of the query is an instruction to identify Inside IP addresses that are talking to Outside IP addresses, such that those Inside IP addresses support network services. The "(:Plugin_Critical)" portion of the query is an instruction to identify critical vulnerabilities, and the "(inside:Inside_IP)-[t*2]→(:Plugin_Critical)" portion of the query is an instruction to identify Inside IP addresses that have a crucial vulnerability. Then the final "return r, s, t, limit 10" portion of the query is an instruction to identify those combined relationships, i.e., Inside IP addresses that support and network services and are talking to outside IP addresses, with the number of results listed limited to 10. The disclosed query generation methods dynamically traverse the graph data model to automatically determine the number of edge connections between two nodes (see, e.g., the [t*2] portion of the query in this example). In the conventional manual query generation process, the user would need to analyze the schema and determine the number of hops between the Inside_IP and Plugin_Critical nodes (two in this example) to be able to create the correct query. The disclosed methods automatically perform this process for the user, which can dramatically reduce the time required to generate a query.

As noted above, the disclosed methods use contextual natural language processing and machine learning to go beyond rigid, pre-defined graph database queries and support flexible, ad hoc user queries posed using natural language. The methods infer user intent from the natural language query and generate a corresponding query in the formal graph database query language. The methods employ adaptive processes that leverage system operator decisions as feedback for continual improvement in its machine learning functions. User interface capabilities like auto-complete also facilitate this recommendation and feedback process. User adjustments such as corrections to translated queries prompt the machine learning model to learn and adapt.

Figure 3:
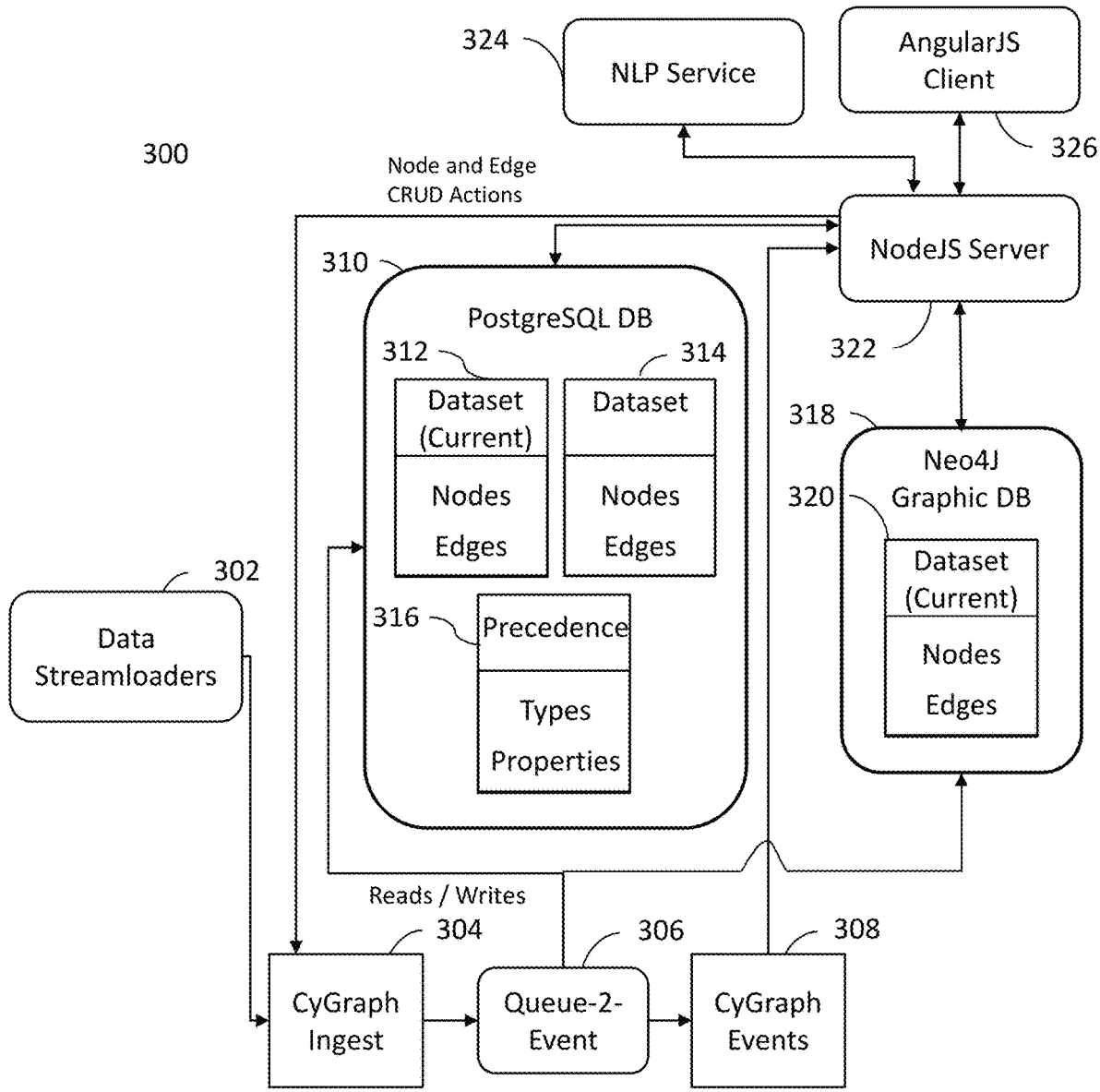
FIG. 3 illustrates the integration of natural language processing and machine learning-based graph database query generation with the CyGraph cybersecurity platform.

Machine learning-based natural language processing and graph database query generation methods may be deployed as a network service and accessed via a GUI for the graph database system (e.g., the RESTful interface for the CyGraph cybersecurity system). FIG. 3 illustrates the natural language processing and machine learning-based query generation functionality 326 as integrated with the CyGraph cybersecurity platform 300. The cybersecurity analysis system, 300, can be configured to receive data from a plurality of input data streams (or message streams), 302, supplied by, for example, one or more data brokers, where different data streams comprise different types of data that has been collected and aggregated from a variety of different data sources, e.g., network sensors, network monitoring tools, and the like. Non-limiting examples of input data streams include NetFlow data streams, Nessus data streams, Splunk Alert data streams, and the like.

In the non-limiting example illustrated in FIG. 3, the input data streams (e.g., NetFlow, Nessus, and Splunk Alert data streams) provided by data broker 205 in the example of FIG. 2, are monitored by corresponding data streamloaders that are configured to monitor their respective data streams and receive incoming message data. Each streamloader is configured to receive message data of a specific type and format, convert the message to a common graph database ingestion format comprising a node or edge, and output the converted message to a message queue, e.g., the "CyGraph Ingest" message queue, 304.

The converted messages placed in the "CyGraph Ingest" message queue, 304, are received by the "Queue-2-Event" network service, 306, which writes the converted (node/edge) data to both a first graph database (e.g., a PostgreSQL database), 310, and a second graph database (e.g., a Neo4J graph database), 318, converts the message data to an event format (e.g., the "CyGraph Event" format), and outputs the event message to another message queue, e.g., the "CyGraph Events" message queue, 308, as illustrated in FIG. 3. Within the graph database, 310, the newly received node and/or edge data is written to dataset 312. The newly received node and/or edge data is also written to dataset 320 in graph database 318. Multiple datasets, 312 and 314, may be stored in the first graph database, 310, along with a precedence table, 316, which includes information about data type and data properties that is used to update graph models derived from the data contained within the graph databases, 310 and 318, with the new node and/or edge data. The capability for storing multiple datasets allows multiplexed updating and analysis of graph models derived from two or more datasets. In some instances, the first graph database, 310, may also store additional information, e.g., metadata associated with one or more datasets, that isn't stored within the second graph database, 318.

The event message added to the "CyGraph Events" message queue, 308, is received by a graph database server (e.g., a NodeJS server), 322, which serves as an interface between the graph databases, 310 and 318, and users of the cybersecurity analysis system, e.g., users that access and query the graph model through the disclosed natural language processing (NLP) and query generation service (or "NLP/query generation service"), 324, or through an AngularJS Client interface, 326. In some instances, receipt of a new message on the "CyGraph Event" message queue, 308, by the graph database server, 322, may trigger an alert that is sent to users of the system. In some instances, receipt of a new alert from the system may cause users of the system to submit new graph database queries via the natural language processing (NLP) and query generation service, 324.

Figure 4A:
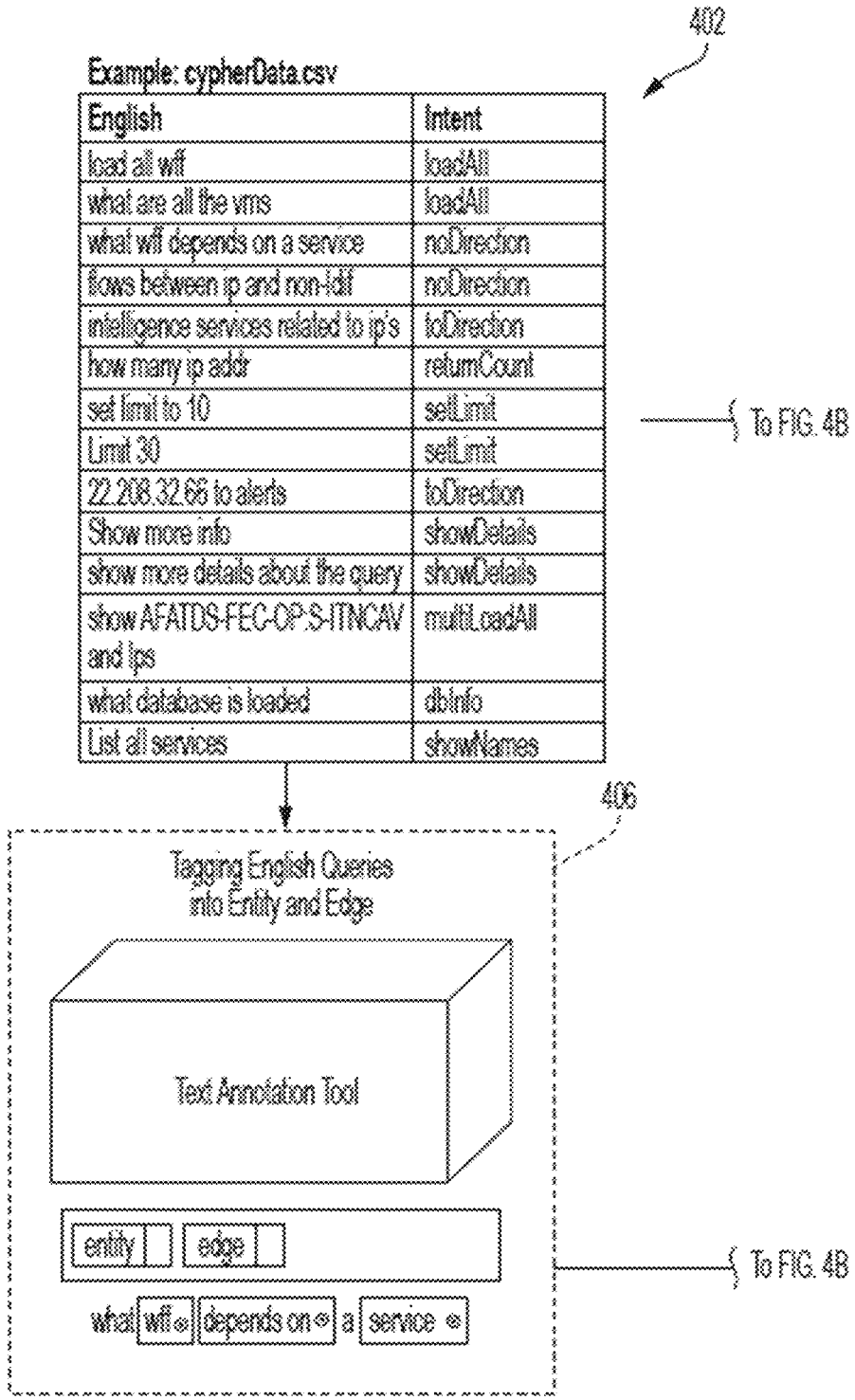
FIG. 4A provides a non-limiting example of annotated training data used to train an intent classification model.
Figure 4B:
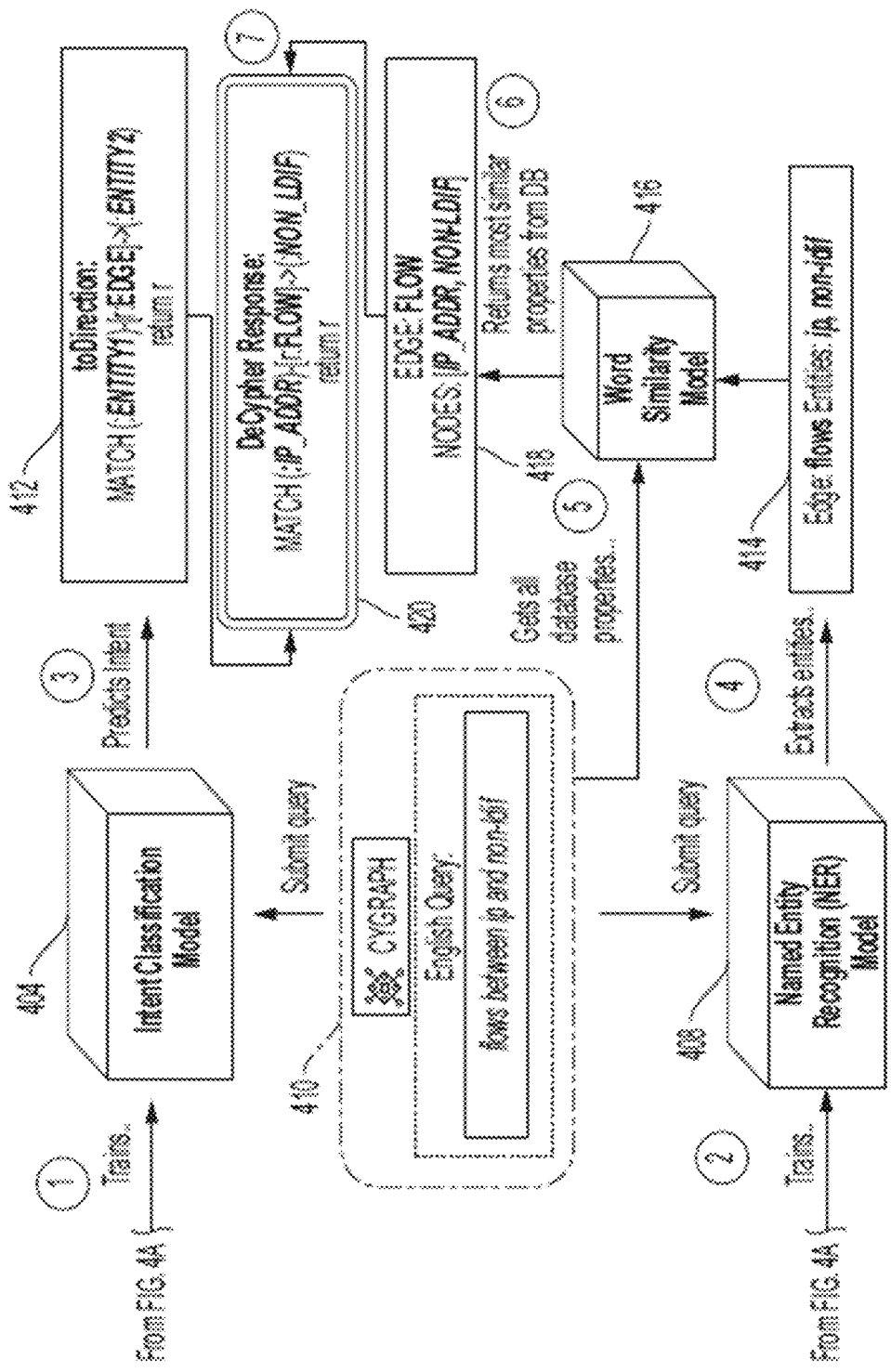
FIG. 4B illustrates the training of machine learning models and their use for natural language processing and graph database query generation according to one non-limiting example described herein.

FIGS. 4A and 4B illustrate the training and use of machine learning models for natural language processing and graph database query generation according to one non-limiting example. In some instances, natural language processing and machine learning-based graph database query generation may be implemented using one, two, three, or more than three trained machine learning models and algorithms, for example:

I. Intent Classification: an intent classification model 404 (e.g., a trained Bidirectional Encoder Representations from Transformers (BERT) model, a long short-term memory (LSTM) model, or a Naïve Bayes algorithm) is used to determine the query intent of the English question submitted by the user. Each learned intent corresponds to a parameterized class of queries. The intent classification model is trained in process step 1 of FIG. 4B using annotated training data comprising English query and intent pairs 402 as illustrated in FIG. 4A. Examples of query classes include, but are not limited to, loadAll (e.g., shows all nodes or edges of a specific type), noDirection (e.g., relationship between nodes/entities with no specific direction from one entity to the other. Shows a general relation), toDirection (e.g., directional relationship from one entity to), orQuery (e.g., relationship for more than one node/edge entity), returnCount (e.g., the number of nodes/entities that match a set of query criteria), setLimit (e.g., updates the limit on the number of returned results from the prior generated query), showDetails (e.g., displays a plain text result from the prior asked query, Shows more details regarding the prior asked query by listing in plain text the resulting nodes, edges and total result count), multiLoadAll (e.g., load multiple sets of nodes/entities that match a set of query criteria), dbInfo (e.g., show what database is presently loaded into the system, displays nodes and edge types), and returnNames (e.g., list the name properties of all nodes/edge entities). In some instances, the training data may comprise, e.g., a CSV file containing English phrases and corresponding classes.

In some instances, the intent classification model used to implement the disclosed methods may be trained to identify a number of different user intents in a natural language query. In some instances, the intent classification model may be trained to identify at least 5, at least 10, at least 15, at least 20, or at least 25 different user intents. In some instances, the intent classification model used to implement the disclosed methods may be trained to perform multi-label classification of user intents rather than, e.g., binary classification, to provide more nuanced interpretation of user intent.

II. Named Entity Recognition (NER): a named entity recognition model 408 (e.g., a trained SpaCy NER model) is used to extract node and edge values from the input English questions and tags them according to entity types. The named entity recognition (NER) model is trained in process step 2 of FIG. 4B using training data comprising annotated English phrases that have been labeled with node and edge values (406 in FIG. 4A). In some instances, the NER model may comprise a recurrent neural network (RNN) such as that provided as part of the SpaCy open source library.

In some instances, the named entity recognition model (NER) model used to implement the disclosed methods may be trained to identify and tag a number of different node and edge value pairs in a natural language query. In some instances, the named entity recognition model (NER) model may be trained to identify and tag at least 2, at least 5, at least 10, at least 15, at least 20, at least 25, at least 30, at least 35, at least 40, at least 45, or at least 50 different node and edge value pairs.

III. Semantic Similarity Checking: a semantic similarity checking algorithm 416 is used to compare the extracted entities returned from the NER model to properties of the graph database model (e.g., node types, node names, edges, node properties, edge properties, unique identifiers, etc.) in a CyGraph knowledge base. This aspect of the process is included to keep the NLP and query generation process domain-agnostic.

In practice, a user submits a natural language query through the CyGraph user interface 410, which is sent to both the trained Intent Classification model 404 and the trained NER model 408. In process step 3 of FIG. 4B, the natural language query is processed by the trained Intent Classification model 404, which outputs the predicted intent 412 of the natural language query. In process step 4, the natural language query is processed by the trained NER model 408, which outputs the predicted entities and relationships (nodes and edges) 414. In process step 5, semantic similarity checking algorithm 416 retrieves graph database properties, compares them to the predicted entities and relationships of the natural language query 414, and returns the set of most similar graph database properties 418. The set of most similar graph database properties 418 and the predicted intent 412 of the natural language query are then combined to generate a graph database query 420.

Figure 5:
FIG. 5 provides a non-limiting example of the translation of a natural language user query into a formal graph database query using the machine learning-based natural language processing and query generation methods described herein.

FIG. 5 illustrates the result of applying the process described in FIGS. 4A and 4B to a natural language user query. In response to a user submitting the natural language query: "show me machines that talk to outside IPs, have critical vulnerabilities, and host network services", the query is processed by the intent classification model to identify user intent and by the named entity recognition model to identify node and edge values, the latter are compared to properties of the graph database by the semantic similarity checking algorithm, and the NLP/query generation service outputs the formal graph database query indicated in the figure.

In some instances, the disclosed methods may be adapted for natural language processing and automated query generation in any of a variety of natural languages. Examples include, but are not limited to, English, Chinese, Japanese, German, French, Spanish, and the like. Adapting the disclosed methods for use with other natural languages may comprise, for example, training of the intent classification and named entity recognition models on training datasets generated in the chosen language.

In some instances, the disclosed methods may be adapted for natural language processing and automated query generation for graph database systems designed for any of a variety of application domains. In addition to cyber security applications (as for the CyGraph system), the disclosed methods may be used with graph database systems designed for applications including, but not limited to, military tactical operations, edge computing (i.e., a topology- and location-sensitive form of distributed computing that brings computation and data storage closer to the sources of data), fog computing (i.e., a distributed computing architecture that uses peripheral devices connected to the cloud via the Internet to carry out computation, storage, and communication), federated computer network architectures (i.e., a group of computing or network providers that agree upon a set of operation standards in a collective fashion), cyber-physical systems in which physical and software components are deeply intertwined, models that capture organizational mission dependencies at various levels of abstraction, and other network architectures. Adapting the disclosed methods to other application domains may comprise, for example, training of the intent classification and named entity recognition models on training datasets comprising phrases chosen from the specific application domain.

Figure 6:
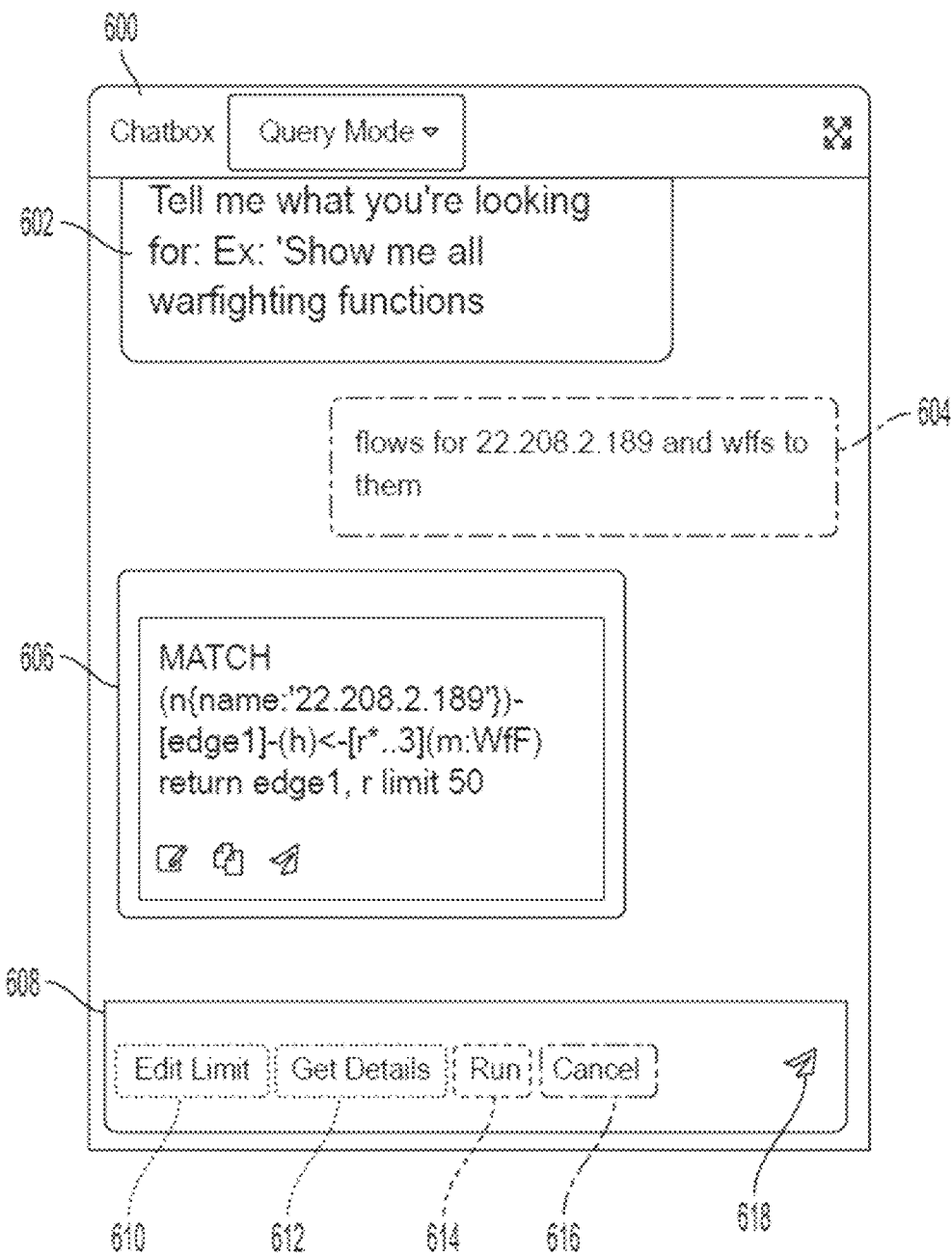
FIG. 6 shows a non-limiting example of a chat panel in the graphical user interface for a graph database system.

FIG. 6 shows a non-limiting example of a graphical user interface (GUI) or chat panel 600 in the graphical user interface for a graph database system (e.g., the CyGraph cybersecurity system). In some instances, the chat panel 600 may include a suggestion or prompt panel 602 that displays a prompt from the NLP/query generation service. The chat panel 600 accepts a natural language question from a system operator or user (e.g., entered in panel 604), submits it to the machine learning-based NLP/query generation service that runs the process illustrated in FIGS. 4A and 4B to translate it to a formal graph database query, presents the formal graph database query to the operator for validation (e.g., in panel 606). The chat panel 600 may include an operator feedback panel 608 that includes, e.g., button 610 that allow the operator to edit the results limit, button 612 that returns plain text details resulting from the formal graph query as displayed in panel 606, button 614 that accepts and runs the formal graph database query as displayed in panel 606, or button 616 that rejects the formal graph database query displayed in panel 606. In some instances, chat panel 600 may also include a button 618 for submitting questions or requests for help to, e.g., other system operators or a system administrator. In some instances, the chat panel 600 may include additional functionality, e.g., an "edit" button (not shown in FIG. 6) for manual editing of the formal graph database query displayed in panel 606, as well as an intelligent auto-complete function, and enhanced graph analytics. The inclusion of options for providing operator feedback allow the training of the intent classification and named entity recognition models to be periodically or continuously updated so that the performance of the NLP/query generation service improves over time.

Figure 7:
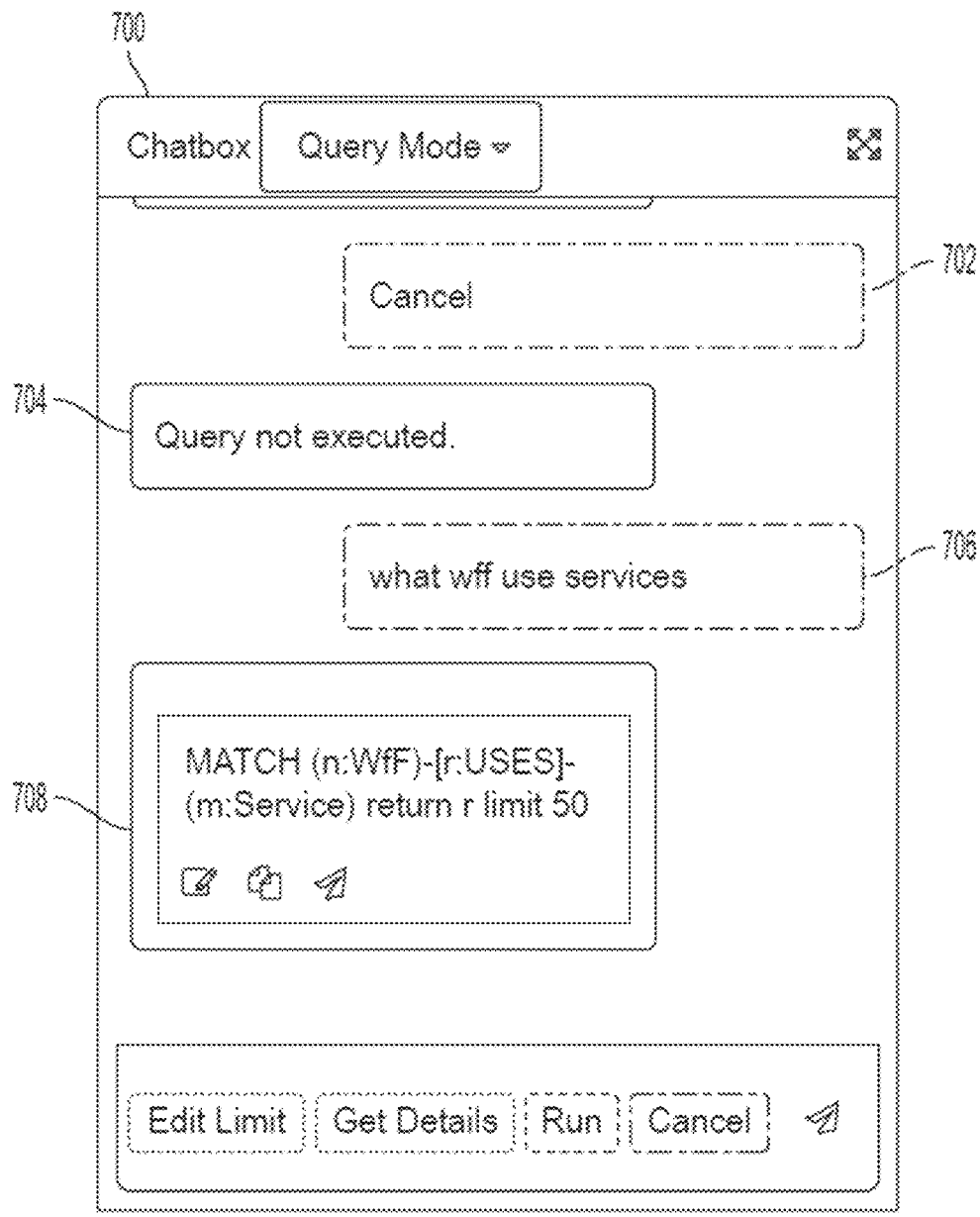
FIG. 7 shows a non-limiting example of a chat panel in the graphical user interface for a graph database system.

FIG. 7 shows a non-limiting example of a graphical user interface (GUI) or chat panel 700 that may be displayed if the system operator (or user) rejects the formal graph database query generated in response to the example query illustrated in FIG. 6. After viewing a translated query, the system operator may press the cancel button (616 in FIG. 6) thereby prompting the GUI to display a "cancel" message in panel 702 and a confirmation message in panel 704. The system operator may rephrase the query and enter it in panel 706, thereby causing the NLP/query generation service to provide a new translation into formal graph database query language, as illustrated in panel 708.

Figure 8:
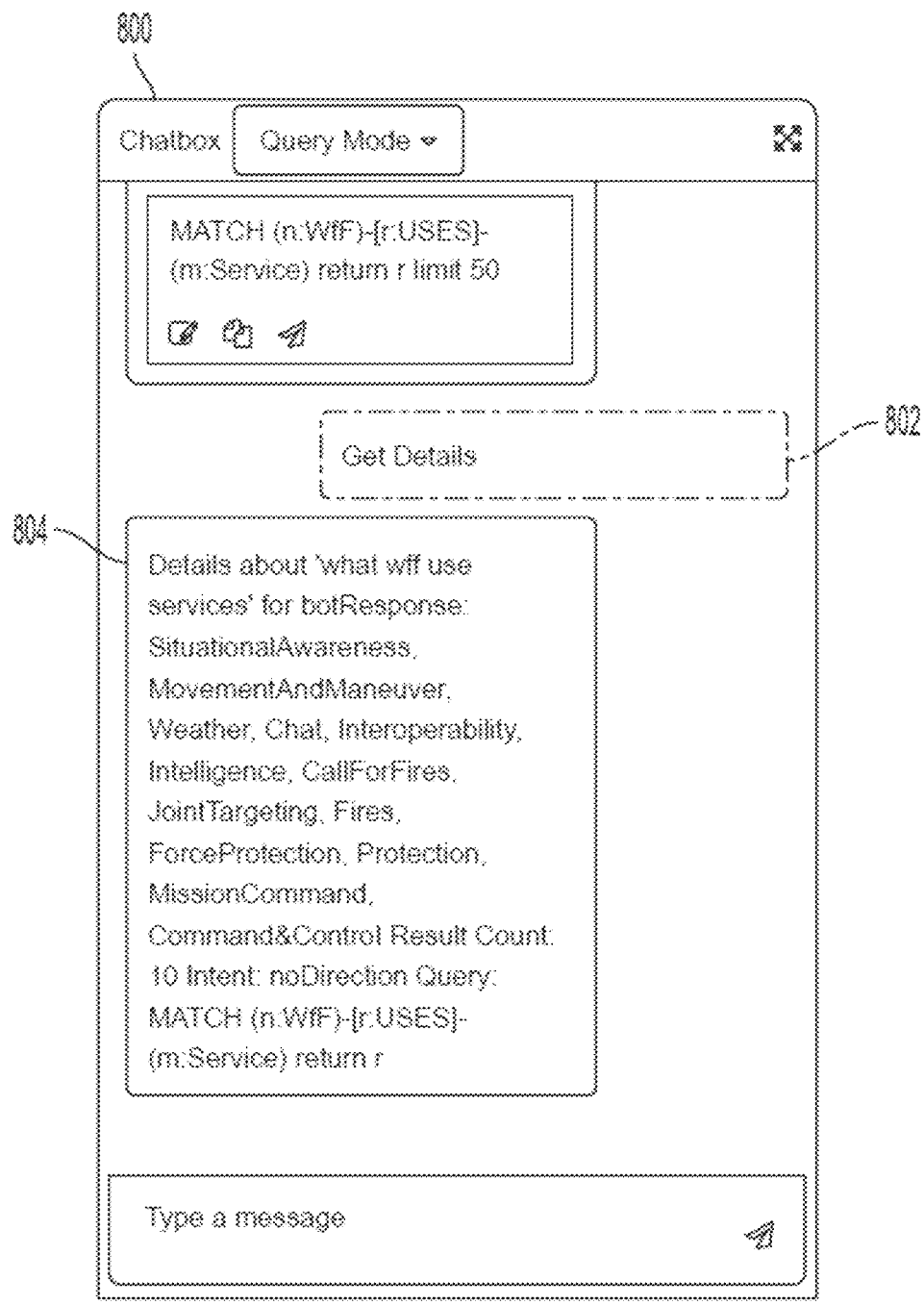
FIG. 8 shows a non-limiting example of a chat panel in the graphical user interface for a graph database system.

FIG. 8 shows a non-limiting example of a graphical user interface (GUI) or chat panel 800 that may be displayed in response to a follow-up query from the system operator or user, e.g., if a user selected the Get Details button (612 in FIG. 6) requesting the system to show the query results in panel 802. The system responds with a listing of warfighting functions (WfF) that use network services in panel 804.

Figure 9:
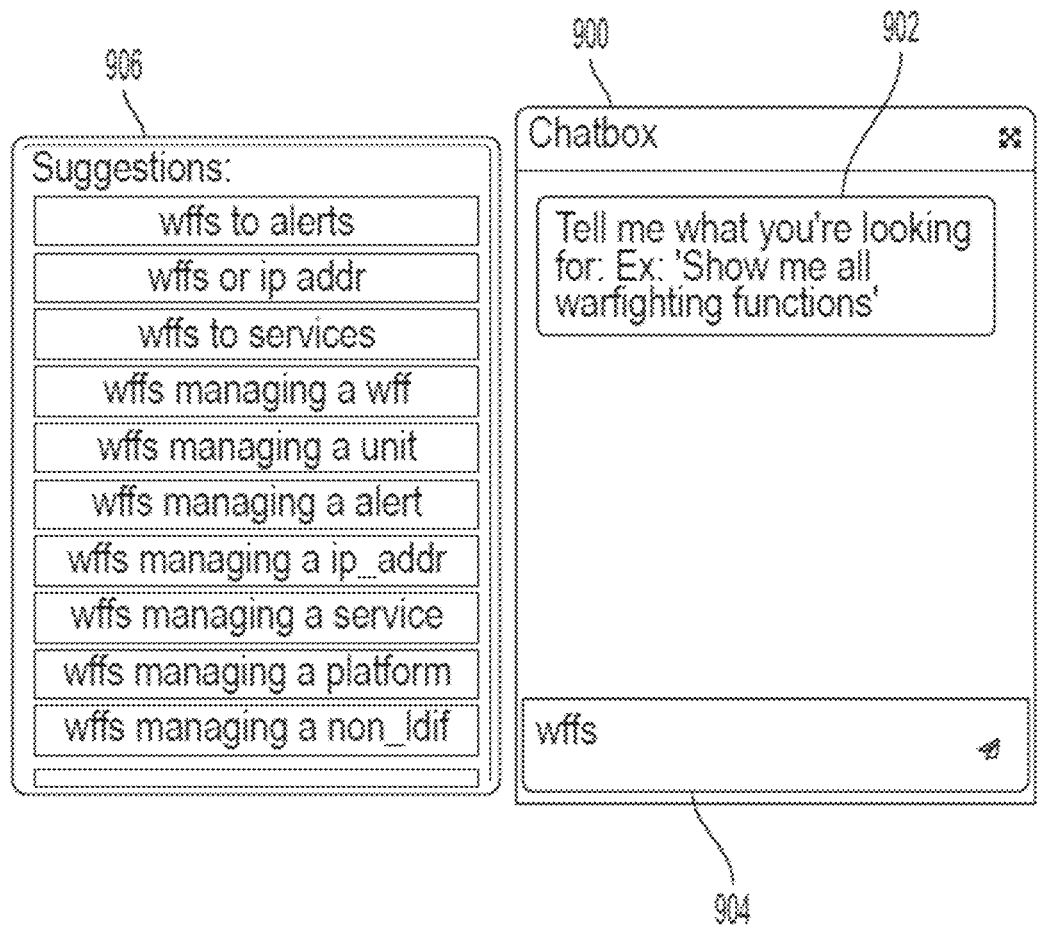
FIG. 9 shows a non-limiting example of a chat panel in the graphical user interface for a graph database system that includes an intelligent auto-complete function.

FIG. 9 shows a non-limiting example of a chat panel 900 in a graphical user interface (GUI) where the NLP/query generation service includes an intelligent auto-complete function. Following a prompt from the system 902, the system operator or user enters a partial query or phrase in panel 904. The system then displays a list 906 of related queries that include the partial query or phrase, and from which the system operator or use may then choose. The intelligent auto-complete function leverages both machine learning (e.g., long short-term memory (LSTM) machine learning models trained on previous queries to perform word-by-word prediction) and traditional methods (e.g., directed word graphs (DWGs) for letter-by-letter prediction) to generate new (previously unseen) queries that are relevant to the currently loaded graph model through an analysis of the graph model. In some instances, the intelligent auto-complete function rank orders query suggestions according to a weighted combination of previous English language query frequency and intent relevance.

Figure 10:
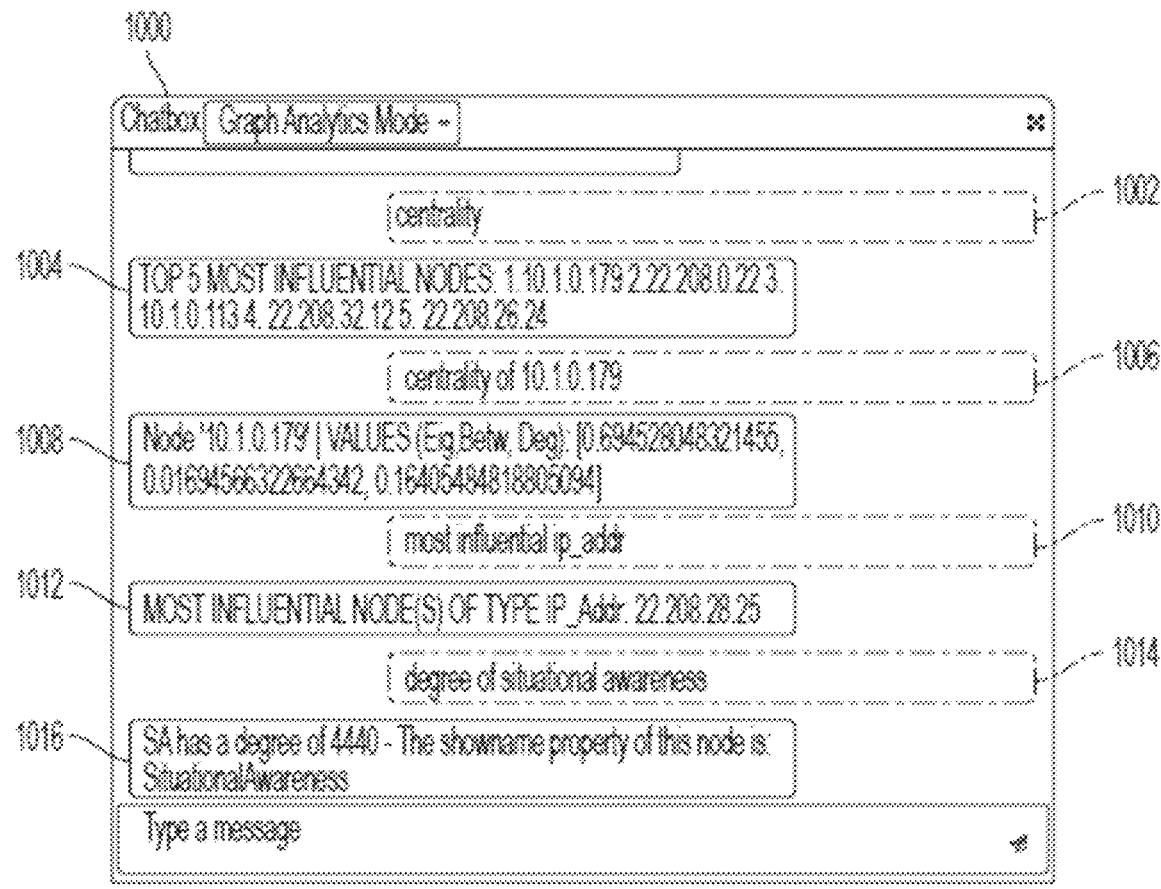
FIG. 10 shows a non-limiting example of a chat panel in a graphical user interface for a graph database system that includes an enhanced graph analytics function.

FIG. 10 shows a non-limiting example of a chat panel 1000 in a graphical user interface (GUI) where the NLP/query generation service includes an enhanced graph analytics function. In some instances, the NLP/query generation service is configured to run graph analytic algorithms on the graph model to determine influential nodes, views results in plain text through NLP/query generation service output, and visualize the results in the graph database system (e.g., the CyGraph cybersecurity system). For example, in some instances, the NLP service may determine that the user's request is the centrality intent, which calls graph analytic algorithms that blend eigenvector centrality, betweenness centrality, and degree centrality measures to identify influential nodes. Eigenvector centrality is a measure of the influence of a node in a network based on an assignment of relative scores to a set of nodes where, for a given node, connections to other high-scoring nodes contribute more to the score of the node than connections to low-scoring nodes. Betweenness centrality is a measure of centrality based on shortest paths between a group of interconnected nodes. Degree centrality is a measure of centrality based simply on the number of edges that a node has. Additionally, in some instances, the graph analytic algorithm may determine intents for degree, neighbor, flow, and clustering. The degree intent directly returns the number of edge connections a specific node has. The neighbor intent returns results that depict important nodes with respect to the target node referenced in the user's request. The flow algorithm is similar to the neighbor intent, but returns other important nodes that may not be directly connected through one edge connection to the target node. The flow algorithm may allow an analyst to stop further propagation of a threat. The clustering intent clusters the graph into communities of nodes with similar properties, and returns the cluster or group that a node may be part of in the graph model.

As illustrated in FIG. 10, in response to a user entering the query "centrality" in panel 1002, the system returns, e.g., a list of the top five most influential nodes 1004 (listed by unique identifiers in this example). In response to the user entering the query "centrality of 10.1.0.179" in panel 1006, the system returns, e.g., values for the eigenvector centrality, betweenness centrality, and degree centrality for node 10.1.0.179 in panel 1008. In response to the user entering the query "most influential IP_addr" in panel 1010, the system returns, e.g., a list of the most influential node(s) of type IP_addr (by unique identifier) in panel 1012. In response to the user entering the query "degree of situational awareness" in panel 1014, the system returns, e.g., the degree for a SituationalAwareness node in panel 1016. Degree returns the number of edge connections a specific node has, e.g., in this example, the SituationalAwareness node contains 4,440 direct connections to other nodes in the dataset. In some instances, the graph analytic algorithm may also manipulate the graph database programmatically to set node/edge styling (e.g., color, size, shape, etc.) based on the determined intents or other output from the graph analytic algorithms. For example, the node sizes may appear larger in the visualization in scale with their betweenness centrality values. The more influential a node is, the higher the betweenness centrality measure, the larger the size in the visualization. Additionally, the node colors may change on a red to green scale based on the number of degree connections that specific node. For example, the more connections a node has, the more red the node will appear, and the fewer, the more green. If a node has an average degree in reference to the other node degrees in the dataset, the node may appear more yellow or orange.

Computer Network Sensors and Network Monitoring Tools:

As noted above, one application for the disclosed methods is in facilitating user queries to a graph-based computer network cybersecurity analysis, e.g., the CyGraph platform. In some instances, the CyGraph platform may receive data directly from a plurality of network sensors and/or network monitoring tools designed to provide real-time information about the state of a computer network. In some instances, network sensor data and/or network monitoring tool data may be sorted and compiled by a data broker, and provided to the cybersecurity analysis system in the form of, for example, topic data streams (or message streams). In some instances, the cybersecurity analysis system may receiving data from network sensors, network monitoring tools, data broker message streams (e.g., Apache Kafka message streams), or any combination thereof. In some instances, the data may be received intermittently, continuously, or asynchronously, e.g., as data messages or packets.

Examples of network sensors that may be used to provide information on the current state of a computer network include, but are not limited to, software-based network taps (e.g., use of monitoring software, remote management protocols (e.g., the simple network management protocol (SNMP)), port mirroring, or switch sniffer methods for collecting information about managed devices), hardware-based network taps (e.g., in-line sniffer devices), V-line tapping (or bypass tapping) methods, firewall logs, NetFlow collectors, and the like.

Examples of network monitoring tools that may be used to provide information on the current state of a computer network include, but are not limited to, the Cauldron (CyVision Technologies, Bethesda, MD) cyber situational awareness tool, the Common Attach Pattern Enumeration and Classification (CAPEC) (MITRE, McLean, VA) tool, the Cyber Analytics Repository (CAR) tool (MITRE, McLean, VA), the Collaborative Research Into Threats (CRITS) tool (MITRE, McLean, VA), the Crown Jewels Analysis (CJA) tool (MITRE, McLean, VA), the Cyber Command System (CyCS) tool (MITRE, McLean, VA), Intrusion Detection Software (IDS) from AT&T (AT&T Cybersecurity, Dallas, TX), the Nessus (Tenable, Inc., Columbia, MD) network vulnerability scanner, the NetFlow (Cisco Systems, Inc., San Jose, CA) network traffic monitoring tool for Cisco or other NetFlow-enabled routers, the Splunk (Splunk, In., San Francisco, CA) software tool for monitoring, searching, and analyzing machine-generated data in real time, the Threat Assessment and Remediation Analysis (TARA) tool (MITRE, McLean, VA) for identifying and assessing cyber vulnerabilities, the Wireshark (wireshark.org) tool for network troubleshooting, analysis, and monitoring of communications protocols, and the like.

Non-limiting examples of the types of data that can be provided by computer network sensors, network monitoring tools, and/or data brokers as input to cybersecurity analysis system include, but are not limited to, information relating to network components, network topology, network vulnerabilities, client/server configurations, firewall rules, network events, and mission dependencies. Cauldron, for example, may be configured to provide network topology information (e.g., subnetworks, routes, firewall locations), host enumeration data, host vulnerability data (based on vulnerability scans), and host firewall rules. The Threat Assessment Remediation Analysis (TARA) tool may be configured to provide enumeration of cyber threats against particular network environments along with possible countermeasures. The Intrusion Detection Systems (IDS) software may be configured to provide detection of intrusion events for mapping to known vulnerability paths leading to mission-critical assets. The Cyber Analytics Repository (CAR) tool may be configured to represent the output of cyber analytics against host-based sensors focused on detecting adversary activities. As another example, network sensors may provide network packet capture data that provides information on general network packing flows. Network sensors may also provide hostflow data relating to the analysis of network packet flows from the perspective of host systems. The Collaborative Research Into Threats (CRITS) tool may be configured to provide an analysis of cyber threat intelligence. The Cyber Command System (CyCS) tool may be configured to provide data relating to dependencies among mission components (high-level to low-level) as well as mission dependencies, including mission dependencies on cyber assets. NetFlow may be configured to provide information on network traffic. Nessus may be configured to provide information on network vulnerabilities. The Splunk tool may be configured to issue alerts that are triggered when a specific search criterion is met for machine-generated data that is being monitored in real time. The various examples provided above are meant as examples only, and should not be construed as limiting in any way.

Graph Model-Based Cybersecurity Analysis Systems:

As noted above, the disclosed methods for natural language processing and automated translation of user queries into a formal graph database query language may be applicable to any of a variety of graph database systems. The CyGraph cybersecurity analysis system, for example, enables security analysts to visualize the status of complex computer networks and rapidly assess the potential impact of network vulnerabilities and adversarial attacks on mission critical functions and capabilities of the network in near real-time. The CyGraph system is illustrated in FIG. 3 as described above, and is further described in U.S. Pat. No. 10,313,382, which is incorporated herein by reference in its entirety.

The CyGraph system provides security analysts with the capability to capture the complex relationships among a plurality of cyberspace components in a computer network and identify mission-critical dependencies of the network on those components. Pattern-matching queries by security analysts are used to interrogate the graph of network relationships according to user-specified constraints, and identify focused clusters of, for example, high-risk activity from the swarm of complex network relationships. User queries can be expressed in a formal domain-specific query language (e.g., the CyGraph Query Language (CyQL)) for interrogating graph patterns of interest, which the CyGraph system translates into a backend native query language. However, as noted above, the process of formulating graph database queries using such a formal graph database query language is time consuming and requires specialized knowledge. The methods and systems described herein alleviate the cognitive load placed on system users (e.g., security analysts) and facilitate ease-of-use of systems such as CyGraph.

The CyGraph cybersecurity analysis system builds information-rich graph models from various network and host data sources, thereby fusing isolated data and events into a unified model of a computer network. Using this graph model, security analysis and computer network operators can apply powerful graph queries that are able to identify, for example, multistep threat pathways for accessing key cyber assets, as well as other patterns of cyber risk. The tool correlates and prioritizes alerts in the context of network vulnerabilities and key network assets.

Traditional graph formulations comprise entities (nodes) and relationships (edges) of a single homogeneous type, and lack the expressiveness required for representing the rich relationship structures involved in analyzing cyber risk. The CyGraph cybersecurity analysis system employs property graphs, i.e., attributed, multi-relational graphs with nodes and edges that may have arbitrary properties. Property graphs have the ability to express and visualize a range of heterogeneous node and edge types which arise from combining data from a variety of sources into a coherent unified cybersecurity graph model. However, this richness of data types and properties contributes to the complexity of formulating user queries. Again, the disclosed methods and systems facilitate ease-of-use and enable users to pose questions that take full advantage of the powerful analytical capabilities of graph database platforms such as CyGraph.

Machine Learning Models:

Any of a variety of machine learning models may be used in implementing the disclosed methods. For example, the machine learning models(s) employed may comprise a supervised learning model, an unsupervised learning model, a semi-supervised learning model, a deep learning model, etc., or any combination thereof.

Supervised learning models: Supervised learning models are models that rely on the use of a set of labeled training data to infer the relationship between a set of input data (e.g., an English language phrase) and a classification of the input data into a specified set of user-specified classes (e.g., user intents). The training data used to "teach" the supervised learning model comprises a set of paired training examples, e.g., where each example comprises an English language phrase and a corresponding user intent. Examples of supervised learning models include support vector machines (SVMs), artificial neural networks (ANNs), etc.

Unsupervised learning models: Unsupervised learning models are models used to draw inferences from training datasets consisting of image feature datasets that are not paired with labeled tissue phenotype classification data. One example of a commonly used unsupervised learning models is cluster analysis, which is often used for exploratory data analysis to find hidden patterns or groupings in multi-dimensional data sets. Other examples of unsupervised learning models include, but are not limited to, artificial neural networks, association rule learning models, etc.

Semi-supervised learning models: Semi-supervised learning models are models that make use of both labeled and unlabeled image patch data for training (typically using a relatively small amount of labeled data with a larger amount of unlabeled data).

Figure 11:
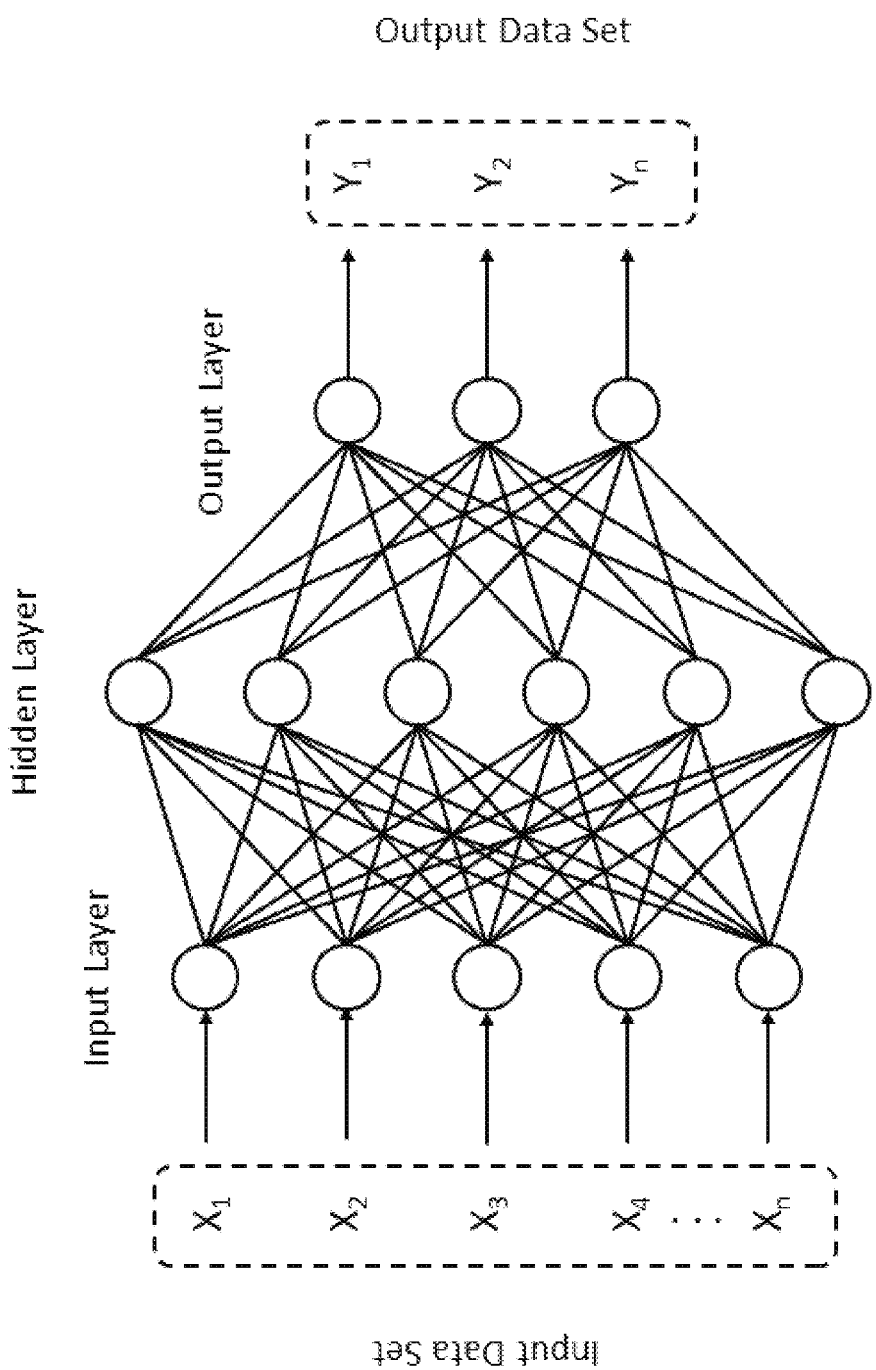
FIG. 11 provides a schematic illustration of an exemplary machine learning architecture comprising an artificial neural network with one hidden layer.

Artificial neural networks and deep learning models: Artificial neural networks (ANNs) are models which are inspired by the structure and function of the human brain. Artificial neural networks comprise an interconnected group of nodes organized into multiple layers. For example, the ANN architecture may comprise at least an input layer, one or more hidden layers, and an output layer (FIG. 11). Deep learning models are large artificial neural networks comprising many hidden layers of coupled "nodes" between the input layer and output layer.

The ANN may comprise any total number of layers, and any number of hidden layers, where the hidden layers function as trainable feature extractors that allow mapping of a set of input data to a preferred output value or set of output values. Each layer of the neural network comprises a number of nodes (or "neurons"). A node receives input that comes either directly from the input data (e.g., image patch data or image feature data derived from image patch data) or from the output of nodes in previous layers, and performs a specific operation, e.g., a summation operation.

Figure 12:
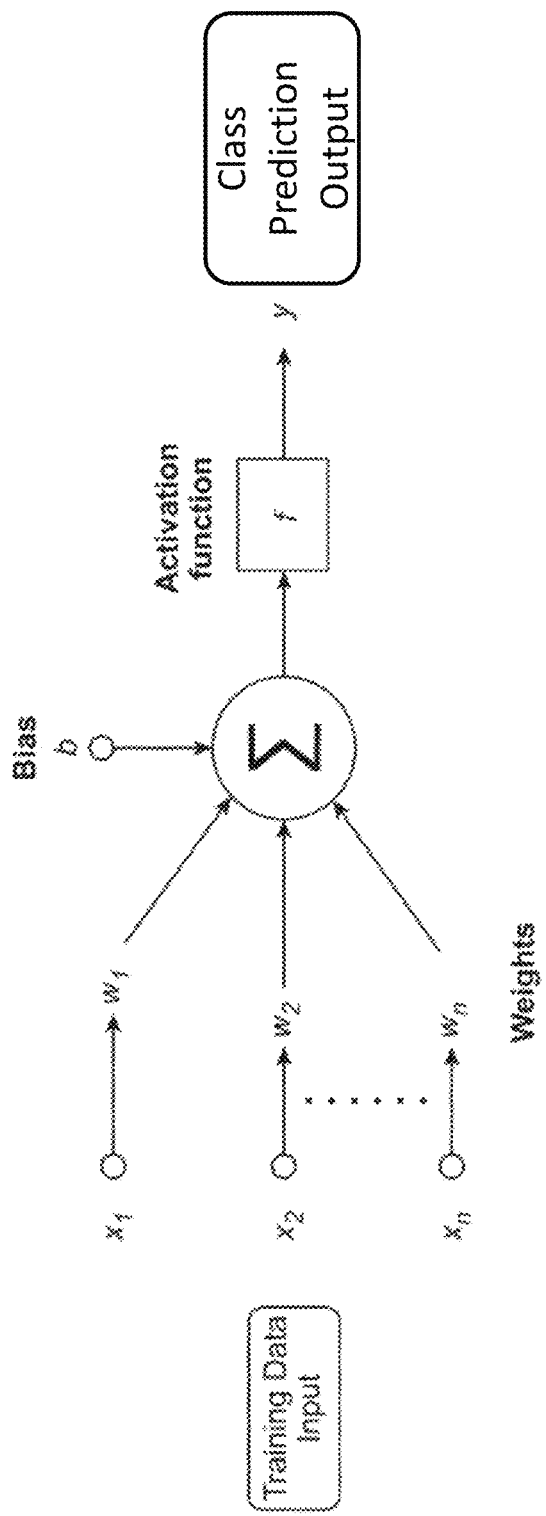
FIG. 12 provides a schematic illustration of an exemplary node within a layer of an artificial neural network or deep learning model architecture.

In some cases, a connection from an input to a node is associated with a weight (or weighting factor). In some cases, the node may, for example, sum up the products of all pairs of inputs, $X_i$, and their associated weights, $W_i$ (FIG. 12). In some cases, the weighted sum is offset with a bias, b, as illustrated in FIG. 12. In some cases, the output of a neuron may be gated using a threshold or activation function, $f$, which may be a linear or non-linear function. The activation function may be, for example, a rectified linear unit (ReLU) activation function or other function such as a saturating hyperbolic tangent, identity, binary step, logistic, arcTan, softsign, parameteric rectified linear unit, exponential linear unit, softPlus, bent identity, softExponential, Sinusoid, Sine, Gaussian, or sigmoid function, or any combination thereof.

The weighting factors, bias values, and threshold values, or other computational parameters of the neural network, can be "taught" or "learned" in a training phase using one or more sets of training data. For example, the parameters may be trained using the input data from a training data set and a gradient descent or backward propagation method so that the output value(s) (e.g., an image patch classification decision) that the ANN computes are consistent with the examples included in the training data set. The adjustable parameters of the model may be obtained using, e.g., a back propagation neural network training process that may or may not be performed using the same hardware as that used for processing images and/or performing tissue sample.

Other specific types of deep machine learning models, e.g., convolutional neural networks (CNNs) (often used for the processing of image data from machine vision systems) or recurrent neural networks (RNNs) (often used for handwriting recognition or speech recognition) may also be used in implementing the disclosed methods and systems. CNNs are commonly composed of layers of different types: convolution, pooling, upscaling, and fully-connected node layers. In some cases, an activation function such as rectified linear unit may be used in some of the layers. In a CNN architecture, there can be one or more layers for each type of operation performed. A CNN architecture may comprise any number of layers in total, and any number of layers for the different types of operations performed. The simplest convolutional neural network architecture starts with an input layer followed by a sequence of convolutional layers and pooling layers, and ends with fully-connected layers. Each convolution layer may comprise a plurality of parameters used for performing the convolution operations. Each convolution layer may also comprise one or more filters, which in turn may comprise one or more weighting factors or other adjustable parameters. In some instances, the parameters may include biases (i.e., parameters that permit the activation function to be shifted). In some cases, the convolutional layers are followed by a layer of ReLU activation function. Other activation functions can also be used, for example the saturating hyperbolic tangent, identity, binary step, logistic, arcTan, softsign, parameteric rectified linear unit, exponential linear unit, softPlus, bent identity, softExponential, Sinusoid, Sine, Gaussian, the sigmoid function and various others. The convolutional, pooling and ReLU layers may function as learnable features extractors, while the fully connected layers may function as a machine learning classifier. As with other artificial neural networks, the convolutional layers and fully-connected layers of CNN architectures typically include various adjustable computational parameters, e.g., weights, bias values, and threshold values, that are trained in a training phase as described above.

Recurrent neural networks (RNNs) are a class of artificial neural networks derived from feedforward neural networks where connections between nodes form a directed graph along a temporal sequence, thereby allowing RNNs to exhibit temporal dynamic behavior. Recurrent neural network models can have an internal state (memory) to process variable length sequences of inputs, and are often used for tasks such as handwriting recognition or speech recognition.

BERT (Bidirectional Encoder Representations from Transformers) is an open source transformer-based machine learning framework for natural language processing (NLP) designed to facilitate interpretation of ambiguous language in text by using the surrounding text to establish context. As noted, BERT is based on Transformer, a deep learning model in which every output element is connected to every input element, and the weighting factors for the connections are dynamically calculated to differentially weight the significance of each part of the input data.

Long short-term memory (LSTM) models are based on recurrent neural network (RNNs) and, unlike standard feedforward neural networks, include feedback connections. They can be used to process, e.g., images, speech, or video data to perform tasks such as classifying, processing, and making predictions based on time series data. An exemplary LSTM unit is composed of a memory cell, an input gate, an output gate, and a forget gate. The memory cell remembers values over arbitrary time intervals while the three gates regulate the flow of information into and out of the cell.

Naïve Bayes classifiers are a collection of probabilistic classification algorithms based on Bayes' Theorem. They share a common principle (i.e., that the features being classified are independent of each other), are highly scalable, and—coupled with kernel density estimation—can achieve high levels of accuracy. In addition, maximum-likelihood training can be performed quickly by evaluating a closed-form expression rather than by using the iterative approximation techniques required for other types of classifiers.

ANN architecture: For any of the various types of ANN models (e.g., ANNs, CNNs, RNNs, etc.) that may be used in the methods and systems disclosed herein, the number of nodes used in the input layer of the ANN (which enable input of data from, for example, sub-sampling of an image frame, a multi-dimensional data set, and/or other types of input data) may range from about 10 to about 2,000 nodes. In some instances, the number of nodes used in the input layer may be at least 10, at least 50, at least 100, at least 200, at least 300, at least 400, at least 500, at least 600, at least 700, at least 800, at least 900, at least 1000, or at least 2000. In some instances, the number of node used in the input layer may be at most 2000, at most 1000, at most 900, at most 800, at most 700, at most 600, at most 500, at most 400, at most 300, at most 200, at most 100, at most 50, or at most 10. Those of skill in the art will recognize that the number of nodes used in the input layer may have any value within this range, for example, about 512 nodes. In some instances, the number of nodes used in the input layer may be a tunable parameter of the ANN model.

In some instances, the total number of layers used in the ANN models used to implement the disclosed methods (including input and output layers) may range from about 3 to about 50, or more. In some instances the total number of layers may be at least 3, at least 4, at least 5, at least 10, at least 15, at least 20, at least 30, at least 40, or at least 50. In some instances, the total number of layers may be at most 50, at most 40, at most 30, at most 20, at most 15, at most 10, at most 5, at most 4, or at most 3. Those of skill in the art will recognize that, in some cases, the total number of layers used in the ANN model may have any value within this range, for example, 8 layers.

In some instances, the total number of learnable or trainable parameters, e.g., weighting factors, biases, or threshold values, used in the ANN may range from about 10 to about 340,000,000. In some instances, the total number of learnable parameters may be at least 10, at least 100, at least 500, at least 1,000, at least 2,000, at least 3,000, at least 4,000, at least 5,000, at least 6,000, at least 7,000, at least 8,000, at least 9,000, at least 10,000, at least 20,000, at least 40,000, at least 60,000, at least 80,000, at least 100,000, at least 250,000, at least 500,000, at least 750,000, at least 1,000,000, at least 2,500,000, at least 5,000,000, at least 7,500,000, or at least 10,000,000, at least $20 \times 10^6$, at least $40 \times 10^6$, at least $60 \times 10^6$, at least $80 \times 10^6$, at least $100 \times 10^6$, at least $150 \times 10^6$, at least $200 \times 10^6$, at least $250 \times 10^6$, at least $300 \times 10^6$, or at least $340 \times 10^6$. In some instances, the total number of learnable parameters may be at most $340 \times 10^6$, at most $300 \times 10^6$, at most $250 \times 10^6$, at most $200 \times 10^6$, at most $150 \times 10^6$, at most $100 \times 10^6$, at most $80 \times 10^6$, at most $60 \times 10^6$, at most $40 \times 10^6$, at most $20 \times 10^6$, at most 10,000,000, at most 7,500,000, at most 5,000,000, at most 2,500,000, at most 1,000,000, at most 750,000, at most 500,000, at most 250,000, at most 100,000, at most 80,000, at most 60,000, at most 40,000, at most 20,000, at most 10,000, at most 9,000, at most 8,000, at most 7,000, at most 6,000, at most 5,000, at most 4,000, at most 3,000, at most 2,000, at most 1,000, at most 500, at most 100, or at most 10. Those of skill in the art will recognize that the total number of learnable parameters used may have any value within this range, for example, about 2,200 parameters.

Machine learning training data: The type of training data used for training a machine learning model for use in the disclosed methods and systems will depend on, for example, whether a supervised or unsupervised approach is taken as well as on the objective(s) to be achieved. In some instances, one or more training data sets may be used to train the model(s) in a training phase that is distinct from that of the application (or deployment) phase. In some instances, training data may be periodically or continuously updated, and used to update the machine learning model(s) used for natural language processing and query generation in a local or distributed network of graph database systems in real time. In some cases, the training data may be stored in a training database that resides on a local computer or server. In some cases, the training data may be stored in a training database that resides online or in the cloud.

Machine learning programs: Any of a variety of commercial or open-source program packages, program languages, or platforms known to those of skill in the art may be used to implement the machine learning models of the disclosed methods and systems. Examples include, but are not limited to, Shogun (www.shogun-toolbox.org), Mlpack (www.mlpack.rog), R (r-project.org), Weka (www.cs.waikato.ac.nz/ml/weka/), Python (www.python.org), and/or Matlab (MathWorks, Natick, MA, www.mathworks.com). Additional examples are provided in the examples described below.

Figure 13:
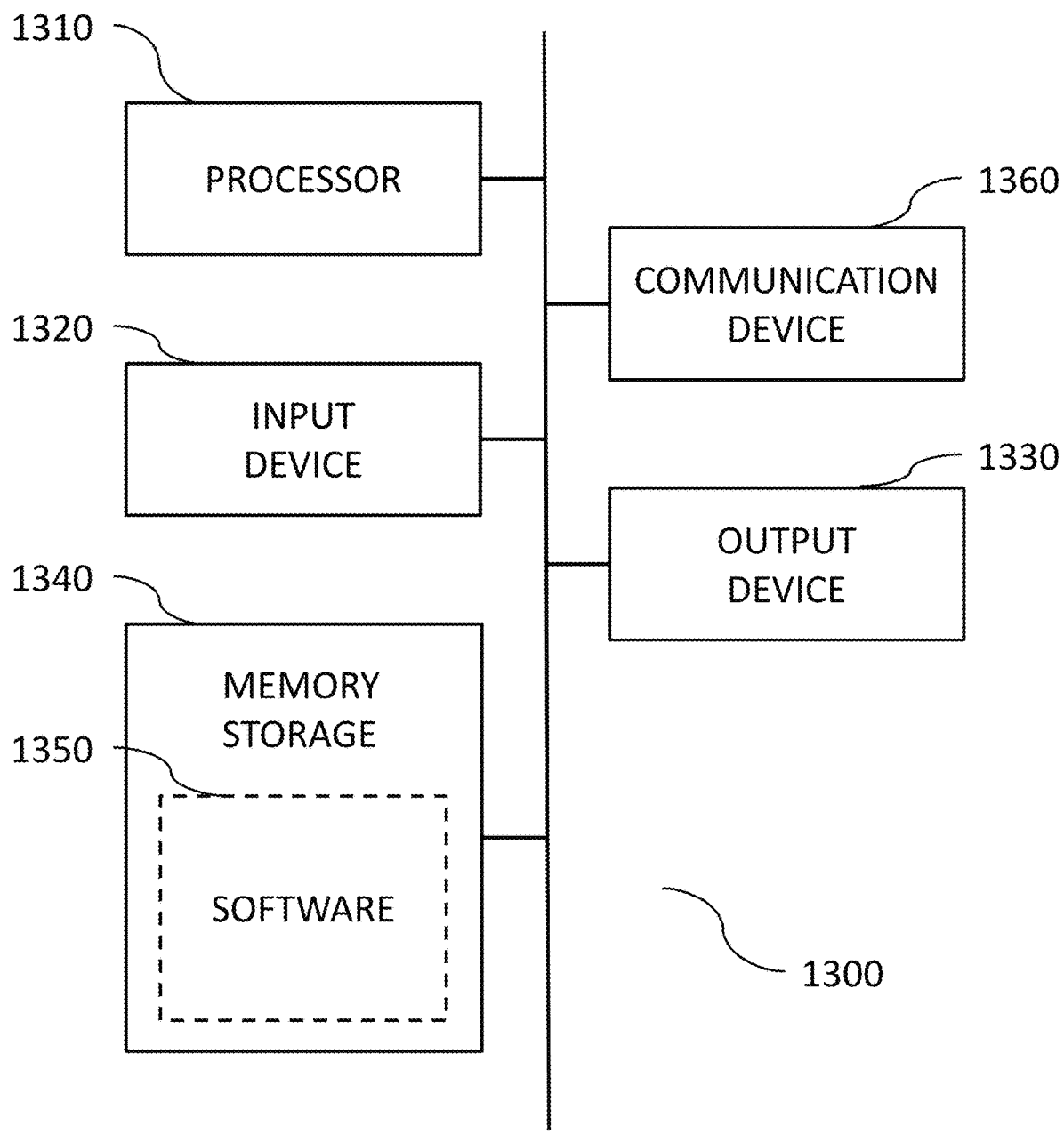
FIG. 13 illustrates an example of a computing system in accordance with one or more examples of the present disclosure.

Computing Devices and Systems:

FIG. 13 illustrates an example of a computing device in accordance with one or more examples of the disclosure. Device 1300 can be a host computer connected to a network. Device 1300 can be a client computer or a server. As shown in FIG. 13, device 1300 can be any suitable type of microprocessor-based device, such as a personal computer, workstation, server, or handheld computing device (portable electronic device), such as a phone or tablet. The device can include, for example, one or more of processor 1310, input device 1320, output device 1330, storage 1340, and communication device 1360. Input device 1320 and output device 1330 can generally correspond to those described above, and they can either be connectable or integrated with the computer.

Input device 1320 can be any suitable device that provides input, such as a touch screen, keyboard or keypad, mouse, or voice-recognition device. Output device 1330 can be any suitable device that provides output, such as a touch screen, haptics device, or speaker.

Storage 1340 can be any suitable device that provides storage, such as an electrical, magnetic, or optical memory including a RAM, cache, hard drive, or removable storage disk. Communication device 1360 can include any suitable device capable of transmitting and receiving signals over a network, such as a network interface chip or device. The components of the computer can be connected in any suitable manner, such as via a physical bus or wirelessly.

Software 1350, which can be stored in memory/storage 1340 and executed by processor 1310, can include, for example, the programming that embodies the functionality of the present disclosure (e.g., as embodied in the devices described above).

Software 1350 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1340, that can contain or store programming for use by or in connection with an instruction execution system, apparatus, or device.

Software 1350 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 1300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1300 can implement any operating system suitable for operating on the network. Software 1350 can be written in any suitable programming language, such as C, C++, Java, or Python. In various embodiments, application software embodying the functionality of the present disclosure can be deployed in different configurations, such as in a client/server arrangement or through a web browser as a web-based application or web service, for example.

EXAMPLES

Example 1—Illustrative Example of Query Processing Workflow

This section provides an illustrative example of the disclosed methods in the form of an example processing workflow. Assume that the operator of the CyGraph cybersecurity platform illustrated in FIG. 3 poses the following English question: "What vms are using chat?" (where vms stands for virtual machines). The disclosed NLP/query generation service tags this input question as follows:

"What [vms](entity) are [using](edge) [chat](entity)?"

It then extracts the following entities:

{Entities: ["vms", "chat"], Edges: "using"}

The word similarity algorithm derives these formal properties by comparison of the extracted entities to the properties of the graph dataset:

{Entity1: "Virt_Mach", Entity2: {name: "Chat"}, Edges: USES}

The NLP/query generation service then determines user intent (from among a plurality of trained recognizable intents):

toDirection

It applies a query template for the toDirection intent:

MATCH (:ENTITY1)-[r:EDGE]->(:ENTITY2) return r

And finally generates the resulting query as translated to the Neo4j Cypher language (the formal graph database query language for the CyGraph platform):

MATCH (:Virt_Mach)-[r:USES]->(: {name: "Chat"}) return r

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A computer-implemented method for translating a natural language user query into a graph database query comprising:
   receiving a first input from a user comprising a natural language query regarding data in a graph database;
   processing the natural language query using a named entity recognition (NER) machine learning model to extract named entities from the natural language query and tag them according to an entity type;
   processing the tagged named entities using a word similarity algorithm to identify corresponding nodes and edges, and their associated properties, in the graph database;
   processing the natural language query using an intent classification machine learning model to determine a user intent for the natural language query; and
   applying a user intent-based template to the identified nodes and edges to formulate a graph database query that corresponds to the natural language query.

2. The computer-implemented method of claim 1, further comprising dynamically analyzing paths in a graph data model stored in the graph database to automatically determine a number of edge connections between a pair of the identified nodes.

3. The computer-implemented method of claim 2, wherein the training of the named entity recognition (NER) machine learning model is updated according to the feedback received from the user.

4. The computer-implemented method of claim 1, further comprising displaying the graph database query on a display device and receiving a second input comprising feedback from the user.

5. The computer-implemented method of claim 4, wherein the second input comprising feedback from the user is a confirmation that the graph database query is an accurate translation of the natural language query.

6. The computer-implemented method of claim 4, wherein the second input comprising feedback from the user is a correction to the graph database query.

7. The computer-implemented method of claim 1, further comprising submitting the graph database query to the graph database.

8. The computer-implemented method of claim 1, further comprising returning a graph database result following submission of the graph database query to the graph database.

9. The computer-implemented method of claim 8, wherein the graph database result comprises a visual display of nodes and edges in a subgraph of the graph database that match the graph database query.

10. The computer-implemented method of claim 8, wherein the graph database result comprises numbers or text.

11. The computer-implemented method of claim 1, wherein the named entity recognition (NER) machine learning model comprises a supervised learning model.

12. The computer-implemented method of claim 1, wherein the named entity recognition (NER) machine learning model comprises a recurrent neural network (RNN).

13. The computer-implemented method of claim 1, wherein the named entity recognition (NER) machine learning model is trained using a set of annotated natural language queries.

14. The computer-implemented method of claim 1, wherein the intent classification machine learning model comprises a supervised learning model.

15. The computer-implemented method of claim 1, wherein the intent classification machine learning model comprises a Bidirectional Encoder Representations from Transformers (BERT) model, a long short-term memory (LSTM) model, or a Naïve Bayes model.

16. The computer-implemented method of claim 1, wherein the intent classification machine learning model is trained using a set of intent-labeled natural language queries.

17. The computer-implemented method of claim 1, wherein the training of the intent classification machine learning model is updated according to the feedback received from the user.

18. The computer-implemented method of claim 1, wherein no prior knowledge of the underlying graph database schema is required of the user.

19. A system comprising for translating a natural language user query into a graph database query comprising:
   one or more processors; and
   a memory communicatively coupled to the one or more processors and configured to store instructions that, when executed by the one or more processors, cause the computer system to:
      receive a first input from a user comprising a natural language query regarding data in a graph database;
      process the natural language query using a named entity recognition (NER) machine learning model to extract named entities from the natural language query and tag them according to an entity type;
      process the tagged named entities using a word similarity algorithm to identify corresponding nodes and edges, and their associated properties, in the graph database;
      process the natural language query using an intent classification machine learning model to determine a user intent for the natural language query; and
      apply a user intent-based template to the identified nodes and edges to formulate a graph database query that corresponds to the natural language query.

20. A non-transitory, computer-readable storage medium storing one or more programs, the one or more programs comprising instructions, which when executed by one or more processors of a computer system, cause the computer system to:
   receive a first input from a user comprising a natural language query regarding data in a graph database;
   process the natural language query using a named entity recognition (NER) machine learning model to extract named entities from the natural language query and tag them according to an entity type;
   process the tagged named entities using a word similarity algorithm to identify corresponding nodes and edges, and their associated properties, in the graph database;
   process the natural language query using an intent classification machine learning model to determine a user intent for the natural language query; and
   apply a user intent-based template to the identified nodes and edges to formulate a graph database query that corresponds to the natural language query.

\* \* \* \* \*